Jan. 30, 1945.　　　E. S. BOYNTON　　　2,368,193
SNAP SPRING
Filed Dec. 10, 1942
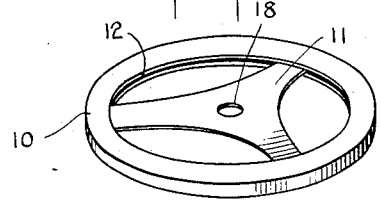
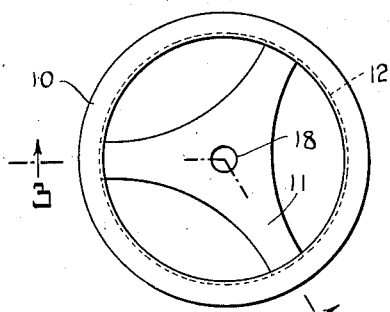
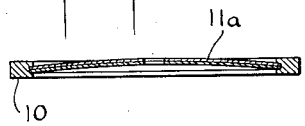
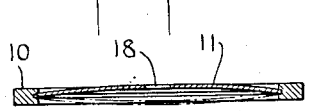
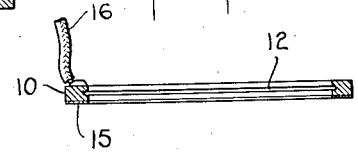
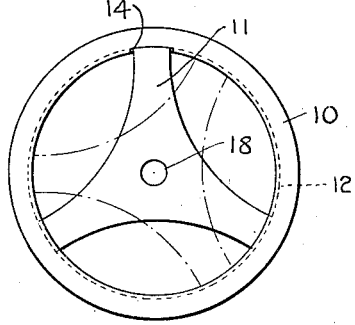
INVENTOR
Earl S. Boynton
BY
HIS ATTORNEY Patented Jan. 30, 1945

2,368,193

UNITED STATES PATENT OFFICE 2,368,193

SNAP SPRING

Earl S. Boynton, East Orange, N. J., assignor to John B. Pierce Foundation, New York, N. Y., a corporation of New York Application December 10, 1942, Serial No. 468,485

2 Claims. (Cl. 267—1)

This invention relates to improvements in snap springs.

It is an object of the invention to provide an improved snap spring or overcenter device in which the throw characteristics are capable of repetition over an extended life period.

It is an object of the invention to provide a snap spring or the like in which the force required to throw the spring may be accurately foretold, and in which such spring strength and the extent of throw of the spring will be substantially retained throughout its life span.

It is an object of the invention to provide a snap spring comprising a spring member and mounting means therefor, in which the mounting means may be subjected to elevated temperatures or mechanical treatment to render the same suitable for employment in various apparatus prior to the association of the spring member therewith.

It is an object of the invention to provide a snap spring or the like comprising a spring member and mounting means therefor, said mounting means being capable of employment as an electric contact or other purpose.

It is an object of the invention to provide a snap spring or the like useful as an electric contact element of a circuit breaker, embodying a spring member and a retaining ring therefor, said retaining ring being of material different from the spring element, and particularly suitable for service as an electricity conductor.

According to a preferred form of the invention, the improved snap spring consists of a spring element and an annular retaining ring, said ring having a continuous groove or an intermittent series of grooves, provided on an inner wall thereof. The spring member may be in the shape of a legged element, stamped from flat stock of beryllium copper or other material having proper spring characteristic and resistance to failure by fatigue. Said legged center portion has an initial diameter, as determined by the outer ends of the legs thereof, slightly greater than the maximum diameter of the groove provided in the retaining ring, whereby the spring member must be arched in order to permit the legs thereof to enter the grooves of the retaining ring. Pursuant to such difference in diameter, the center portion is maintained in a bowed form, and is capable of overcentering to an oppositely bowed configuration upon the exertion of suitable external forces, the strength of force required to throw the spring depending upon the rigidity of the spring material and/or the extent of arch.

If desired, the retaining ring may be formed with an entering slot capable of receiving one of the legs of the spring member. In such construction, all but one of the legs of the spring member are inserted into the groove in the retaining ring, whereupon the spring member may be arched in a suitable jig and the remaining leg brought into the groove through the slot. Following such introduction, the ring may be rotated with respect to the spring member to move such leg away from the entering slot, whereby the spring is retained against disassociation with the retaining ring. If desired, the ring adjacent the entering slot may be crimped after insertion of the spring to prevent a rotation of the spring member which would bring a leg thereof into registry with the entering slot.

The ring, not being itself a spring member, may be of any suitable material depending upon the purpose for which the device is to be used. For example, if the snap spring is to be used as an element of an electric circuit breaker, said ring may be constructed of silver or other material having a high conductivity. Alternatively, the member may be of brass or other base metal, silver plated or provided with a silver surface welded thereto. A pig-tail or other flexible conductor may be brazed to the ring to transmit electricity from the ring to a binding post or the like.

It is a feature of the invention that such work of brazing, welding or the like may be performed prior to the association with the ring of the spring member per se, thereby not subjecting the snap spring to the effects of high temperature or mechanical operation which might affect its calibration or throw characteristic.

Further features and objects of the invention will be developed by reference to the accompanying drawing and specification.

In the accompanying drawing:

Fig. 1 is a perspective of one form of snap spring constructed pursuant to the present invention;

Fig. 2 is a top plan view thereof;

Fig. 3 is a section taken on lines 3—3 of Fig. 2, additionally showing the two positions of stability capable of assumption by the spring member;

Fig. 4 is a plan view of a second form of a snap spring in which the retaining ring has been provided with an entering slot to facilitate the insertion of the spring member therein;

Fig. 5 is a section similar to Fig. 3, showing the employment of a bimetal member for the spring element; and Fig. 6 is a similar section of a snap spring for employment as a contact of electrical apparatus, in which the ring member has been provided with a conducting surface of silver or the like, and a flexible connection welded thereto.

Referring to the drawing for a more complete description of the invention, a preferred form of the improved snap spring includes a retaining ring 10 and a preferably legged spring member 11. Said retaining ring is provided on its inner wall with a preferably continuous groove 12 milled to suitable depth.

The spring member 11 may be stamped or die cut from material of suitable springable quality, such as beryllium copper, phosphor bronze, stainless steel, or other materials having desirable fatigue resisting or other qualities. The spring portion 11 is stamped from flat stock and the diameter of said spring 11, as measured with respect to the terminals of its respective leg portions, is suitably greater than the maximum diameter at the base of the groove 12, so that when the spring member is to be operatively associated with the retaining ring, it must be arched to permit the insertion of the ends of its legs into the groove. After insertion, the spring member is maintained in continuously bowed position.

As an example of suitable dimensions of the retaining ring and the spring member, a retaining ring having an inside diameter of .937 inch, an outside diameter of 1.125 inches and a diameter at the base of the groove 12 of 1.000 inch may be employed with a snap spring member 11 having a diameter, in the flat, of 1.008 inches. In other words, the diameter of the spring member as cut from flat stock is .063" greater than the inner diameter of the ring and .008" greater than the diameter of the groove into which the leg portions fit.

In assembling the Fig. 1 embodiment, the spring member 11 may be bowed in a suitable jig until the diameter at the legs is less than the internal diameter of the ring, whereupon the ring may be slipped over the spring member. Upon release of the restraining force thereon, the legs expand and enter the groove, which is not of sufficient diameter to permit the spring member to return to its original flat condition.

The thickness of the material of spring 11 and the extent of arch when in assembled position, determines the force required to throw the spring 11 from one to the other of its stable positions.

An alternative construction is illustrated in Fig. 4, wherein the ring 10 is provided with an entering slot 14 slightly larger than the width of the extremity of a leg of the spring member 11, said slot 14 communicating with the groove 12. Two of the legs of the spring member may be inserted into the groove 12 with its remaining leg in registry with the slot 14, whereupon on arching the spring, the leg may be passed through said slot. A rotation of the spring 11 with respect to the ring 10, as indicated by the broken lines of Fig. 4, carries the said leg beyond the area of the slot and the spring is retained within the ring in suitably bowed position. If desired, the areas of the ring 10 on either side of said slot 14 may be crimped or upset to prevent a return of spring 11 to its Fig. 4 position; in other words, the escape of the spring 11 from the groove 12 is precluded.

Fig. 5 indicates an embodiment of the invention wherein the spring member, designated 11a, is formed from thermostatic or bimetallic material, imparting to the spring 11 the faculty of creating strains within itself on an increase or decrease of temperature capable of causing said spring to invert from concave to convex form or vice versa.

A snap spring according to the present invention has as a principal attribute, the property of maintaining its original setting or throw characteristic throughout a long period of usefulness. Such calibration retention results, among other things, from the fact that no mechanical work other than the work of flexing the spring is performed on the spring after it has been initially cut from the flat blank. In conventional forms of snap springs, it is frequently necessary to heat treat the spring or to work on its retaining structure in a manner deleterious to the material of the spring. Such prior art forms make it difficult to predict the throw characteristic of the spring after the spring has been assembled. In other words, each such prior art spring, after construction, must be calibrated to determine whether or not the additional operations performed thereon have adversely affected the spring material.

The faculty of retaining its throw characteristic renders the spring of the present invention particularly suitable for employment in electric circuit breaking devices in which the spring may comprise an element of the contact assembly of such device. When so employed, the retaining ring 10 may be formed from silver or other material of high electrical conductivity, or a base metal ring such as brass may be surfaced with a layer 15 of silver or the like, as shown in Fig. 6. A flexible conductor 16 may be brazed or soldered to the ring 10 to connect the ring to a suitable binding post. It is obvious that such silver surfacing and brazing steps may be performed on the ring 10 prior to the insertion of the spring 11 therein, thereby completing such steps without heating or otherwise mechanically working upon the spring 11.

The depth of groove 12 and the height thereof, are suitably proportioned with respect to the thickness of the spring 11 at the leg extremities to permit a relatively tight confinement of the legs, preventing them from jumping out of engagement with the retaining ring during flexing. The fulcrum points of the legs, therefore, are probably not at the extremities of the legs, but rather in zones immediately adjacent the juncture of the legs with the retaining ring.

In the application of a snap spring according to the present invention, the spring may be supported from a shaft secured through the aperture 18 and the supporting ring 10 may be movable relatively to such shaft through the action of the spring 11; such arrangement would be useful in circumstances in which the ring 10 served as a movable contact of a circuit breaker or the like. Alternatively, the ring 10 may be clamped in fixed position and the movement of spring 11 translated into useful work by a shaft or the like secured thereto. Many other ways in which the snap spring organization may be employed will be apparent to those skilled in the art.

Whereas I have described my invention by reference to specific forms thereof, it will be understood that many changes and modifications may be made provided they do not depart from the scope of the claims.

I claim:

1. A snap spring including a spring member in which legs extend radially from a center, and retaining means for said spring member, said retaining means comprising a closed, rigid ring having a groove disposed on its inner wall substantially centrally between its upper and lower wall surfaces, the maximum diameter of said groove being less than the maximum diameter of said spring member, whereby upon positioning the legs of said spring member within the groove, the spring member assumes a bowed configuration.

2. A snap spring comprising the combination with a closed rigid ring having a groove provided in its inner wall intermediate the upper and lower faces of said ring, of a spring member including a center portion and a plurality of legs extending radially therefrom into said groove, said ring having in one of its said faces, a slot communicating with said groove, the width of said slot being greater than the width of said legs at the ends thereof, to afford entry of a leg of said spring member into said groove.

EARL S. BOYNTON.